United States Patent
Wessels

(10) Patent No.: US 9,275,507 B2
(45) Date of Patent: Mar. 1, 2016

(54) CONTROL UNIT FOR CONTROLLING AN AUTOMATIC DEVICE FOR PREPARING BEVERAGES

(75) Inventor: Hendrikus Christinus Maria Wessels, Uithoom (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 398 days.

(21) Appl. No.: 13/445,724

(22) Filed: Apr. 12, 2012

(65) Prior Publication Data

US 2012/0258216 A1  Oct. 11, 2012

Related U.S. Application Data

(63) Continuation of application No. PCT/NL2010/050663, filed on Oct. 8, 2010.

(30) Foreign Application Priority Data

Oct. 16, 2009 (NL) ...................................... 2003661

(51) Int. Cl.
*G07F 13/06* (2006.01)
*G07F 9/02* (2006.01)
*A47J 31/52* (2006.01)

(52) U.S. Cl.
CPC *G07F 9/02* (2013.01); *G07F 9/023* (2013.01); *G07F 13/065* (2013.01); *A47J 31/52* (2013.01)

(58) Field of Classification Search
CPC .... G07F 13/065; G07F 9/023; G06Q 30/0621
USPC ................................................. 700/233, 239
See application file for complete search history.

(56) References Cited

U.S. PATENT DOCUMENTS

| | | | | |
|---|---|---|---|---|
| 5,581,670 A | * | 12/1996 | Bier et al. ...................... | 715/856 |
| 6,505,774 B1 | * | 1/2003 | Fulcher et al. ................ | 235/381 |
| 6,759,072 B1 | * | 7/2004 | Gutwein et al. .............. | 426/433 |
| 7,328,171 B2 | * | 2/2008 | Helot et al. ................... | 705/27.2 |

(Continued)

FOREIGN PATENT DOCUMENTS

| CN | 1378432 A | 11/2002 |
|---|---|---|
| CN | 101218611 A | 7/2008 |

(Continued)

OTHER PUBLICATIONS

International Search Report for International Application No. PCT/NL2010/050663, mail date Jan. 4, 2011, 2 pages.

(Continued)

*Primary Examiner* — Timothy Waggoner
(74) *Attorney, Agent, or Firm* — Foley & Lardner LLP

(57) ABSTRACT

A control unit for an automatic device for preparing a beverage, which control unit is provided with a display panel and an input wherein the control unit is provided furthermore with an operating unit for displaying by the display panel a visually observable reaction to designations provided by the user, and for controlling a preparation unit of the automatic device, wherein the display panel has selection fields for mutually exclusive settings for formulations of the beverage to be prepared, wherein the control unit enables the user to select one of the settings by designation of one of the selection fields, wherein a collecting field with at least one setting field shows the chosen setting of the formulation, and wherein the non-designated selection fields remain visible and selectable.

4 Claims, 17 Drawing Sheets

(56) References Cited

U.S. PATENT DOCUMENTS

| | | | |
|---|---|---|---|
| 7,455,867 B1 | 11/2008 | Gutwein et al. | |
| 7,845,375 B2 * | 12/2010 | Dorney | 141/94 |
| 7,896,038 B2 * | 3/2011 | Jones et al. | 141/103 |
| 8,032,251 B2 * | 10/2011 | Monn | 700/233 |
| 8,251,258 B2 * | 8/2012 | Rudick et al. | 222/31 |
| 8,364,321 B2 * | 1/2013 | Kollep | 700/233 |
| 2007/0003062 A1 | 1/2007 | Mizikovsky et al. | |
| 2007/0079258 A1 | 4/2007 | Hsieh et al. | |
| 2008/0183330 A1 | 7/2008 | Monn | |

FOREIGN PATENT DOCUMENTS

| | | |
|---|---|---|
| DE | 10 2008 08 380 | 8/2009 |
| EP | 1 497 747 | 4/2008 |
| EP | 1 992 263 | 11/2008 |
| EP | 1 909 623 | 2/2009 |
| WO | WO-03/090007 | 10/2003 |
| WO | WO-2004/023283 A1 | 3/2004 |
| WO | WO-2006/092464 | 9/2006 |
| WO | WO-2007 003062 | 1/2007 |
| WO | WO-2007/014584 | 2/2007 |

OTHER PUBLICATIONS

Translation of Mexican Office Action for Mexican Application No. MX/a/2012/004391, 2 pages.

Extended European Search Report for Application No. EP 13197778, mail date Apr. 23, 2014, 6 pages.

* cited by examiner

CONTROL UNIT FOR CONTROLLING AN AUTOMATIC DEVICE FOR PREPARING BEVERAGES

CROSS-REFERENCE TO RELATED APPLICATIONS

The present application is a continuation of International Patent Application No. PCT/NL2010/050663 filed on Oct. 8, 2010; which claimed priority to Netherlands Application No. NL 2003661 filed on Oct. 16, 2009, all of which are hereby incorporated herein by reference in their entireties.

BACKGROUND

The invention relates to a control unit for controlling an automatic device for preparing The invention further relates to an automatic device for preparing beverages provided with such a control unit.

The invention further relates to a method for controlling an automatic device for preparing beverages.

Known are devices for preparing beverages provided with a touch-sensitive image display panel, where the image display panel shows a hierarchical menu structure, whereby the user by touching parts from the presented menu chooses step-by-step the composition of the beverage to be dosed. In the main menu the user can choose from, for example, "coffee", "tea", "soup". After selection of one of these options, a new menu appears, in which the user can give a further specification of the selected beverage. If the user makes the selection of, for example, "coffee", thereupon a menu appears in which a choice can be made from the options "with sugar", "with milk", "with sugar and milk", etc. After a choice has been made from these options, in a menu thereupon appearing a choice can be made from amounts of these additions.

EP1909623 B1 describes an automatic device for preparing hot beverages provided with a control panel with an input element and a display element. When the user movingly touches the input element, this results in a scrolling of the presented menu in the image display element. With this, a choice is made of at least one formulation from a plurality of formulations or a setting from a plurality of settings. In practice, a response time of the user needs to be taken into account. As a consequence, it may happen that the user does not stop the moving touch of the input element until the intended choice has already passed. The user then needs to scroll back again to still select the intended menu element. This takes extra time. Possibly, this could be prevented by keeping the speed at which the menu is scrolled low in proportion to the speed of the moving touch. However, a lower scrolling speed also takes extra time.

SUMMARY

An object of the invention is to provide a control unit for a device for preparing beverages that offers the user improved possibilities of making a selection.

It is a further object of the invention to provide a device for preparing beverages that is provided with such a control unit.

It is a further object of the invention to provide a method for controlling a device for preparing beverages that offers the user improved possibilities of making a selection.

To that end, an embodiment of a control unit for an automatic device for preparing a beverage is provided with a display panel and an input means which enables a user by means of designations of image elements shown on the display panel to choose from a plurality of formulations a formulation for the beverage to be prepared, wherein the control unit is furthermore provided with an operating unit for displaying by means of the display panel a visually observable reaction to designations provided by the user, and for controlling a preparation unit of the automatic device, wherein the display panel has selection fields for mutually exclusive settings for formulations of the beverage to be prepared, wherein the control unit enables the user by designation of one of the selection fields to select one of the settings, wherein a collecting field with at least one setting field shows the selected setting of the formulation, and wherein the non-designated selection fields remain visible and selectable, wherein the control unit enables the user to confirm a choice made by making a dragging movement from the designated selection field to the collecting field.

In a corresponding method for controlling an automatic device for preparing a beverage, a user is enabled by means of designations of image elements shown to choose from a plurality of formulations a formulation for the beverage to be prepared, wherein a visually observable reaction to designations provided by the user is given, wherein selection fields are shown, wherein the user is enabled by designation of one of the selection fields to select one of the formulations, wherein in a collecting field with at least one setting field the selected setting of the formulation is shown, and wherein the non-designated selection fields remain visible and selectable, wherein the user is enabled to confirm a choice made by making a dragging movement from the designated selection field to the collecting field.

The control unit and method according to this embodiment of the present invention can provide a better overview to the user than is possible with devices available in the state of the art. Also, after the user has made a selection between mutually exclusive settings for the formulations, for example, the selection "hot water", the settings thereby excluded, e.g., "coffee" or "hot chocolate" remain visible and selectable. As a consequence, after an error or in case of doubt, the user can rapidly select another beverage. The user can give designations, for example, by touching selection fields or by pointing to them. It is also conceivable that the user designates the selection fields by speech commands.

Making a dragging movement gives the user still more the sensation that he is actually composing a beverage. The user can drag, for example, a cup with a basic composition to the collecting field and thereupon drag a lump of sugar or an aroma into the cup. In another embodiment, a confirmation is not necessary, and the selection is already completed after designation of a field. The control unit can indicate an acceptance of the selection auditively by producing a sound associated with the selection, e.g., the sound of coffee flowing into the cup.

In a first embodiment of the control unit according to this embodiment, the collecting field has a single setting field, wherein designation of one of the selection fields results in selection of a setting shown in the respective selection field and wherein the collecting field shows an indication of the formulation of the beverage composed by the user.

This embodiment gives the user a quick insight into the possibilities of the automatic device. The selection fields for the selectable settings for the formulation of the beverage may be orderly arranged on the display panel, so that the user will quickly find his way. After designating the selection fields mentioned the effect thereof is observable in the collecting field. Showing the effects of the choices of the user in the collecting field gives the user the sensation that he himself or she herself is actually composing the beverage to be prepared.

In a further elaboration of this embodiment, selection fields for settings that are excluded by the selected setting are displayed in a manner deviating from the selected selection field.

The deviating display of the non-selected selection fields besides the display of the collecting field gives the user an extra confirmation of the choice made. The content of the non-selected selection fields may be displayed, for example, with a reduced contrast. Alternatively, the deviating display may conversely be realized in that the content of the selected selection field is represented with a reduced contrast or is not represented at all, thereby symbolizing to the user that the selection has been moved to the collecting field.

A second embodiment of a control unit for an automatic device for preparing a beverage is provided with a display panel and an input means which enables a user by means of designations of image elements shown on the display panel to choose from a plurality of formulations a formulation for the beverage to be prepared, wherein the control unit is furthermore provided with an operating unit for displaying by means of the display panel a visually observable reaction to designations provided by the user, and for controlling a preparation unit of the automatic device, wherein the display panel shows a plurality of image elements, which coincide with selection fields, wherein the control unit is equipped with a clock unit for establishing the time, and wherein a formulation for a beverage to be prepared is jointly determined by the selection of a selection field and a time established by the clock unit.

In a corresponding method for controlling an automatic device for preparing a beverage, a user is enabled by means of designations of image elements shown to choose from a plurality of formulations a formulation for the beverage to be prepared, wherein a visually observable reaction to designations provided by the user is given, wherein a plurality of image elements coinciding with selection fields are shown, wherein a formulation for a beverage to be prepared is jointly determined by a selection of a selection field and an established time.

This embodiment of the control unit contributes to a considerably simplified operation of the automatic device. Users of the device can have a personal selection field. Since the formulation of the beverage to be prepared is co-determined by the time established by the clock, the formulation of the beverage to be prepared can depend on the time at which the user designates his selection field. Through designation of a single selection field, the user can nonetheless have different types of beverages prepared, if so desired. The preferences of each user for different times of the day can be stored in a memory. Thus, users, once they have fixed their preference for the different times of the day, only need to designate their personal selection field. This is practical especially in an office environment where it is customary that colleagues by turns get the whole group something to drink. The colleague whose turn it is to get the beverages no longer needs to remember what the other colleagues want to drink, but merely needs to designate the personal selection field of the respective colleagues. The personal selection field may be easily identifiable by the image element coupled with the selection field, e.g., a picture, a caricature, a name or a symbol of a hobby of the respective individual.

In a mode of the second embodiment, the display panel during operation furthermore shows a menu for setting a composition of a beverage to be prepared by the device.

This makes it possible for the user, besides the beverage that is fixed for a particular time of the day by a selection field and the time of the day, to compose any other beverage. This may be, for example, a conventional menu, but may alternatively be a menu according to one of the earlier-described embodiments of the invention.

In a variant of this mode, the display panel during operation furthermore shows a storage selection field, designation of which results in the formulation of the beverage composed by the user being stored in a memory.

In this manner, the user can easily set or change his preference for a particular composition. In an embodiment, there is provided a storage selection field whose designation results in storage of the chosen composition for that time or period of the day. In an embodiment the division of the day is automatically adapted to the results stored by the user. The first formulation stored by the user at a first time is, for example, initially interpreted as a formulation applying to the whole day. In the case of a second stored formulation at a second time, the control unit can divide the day into a first daily period where the first formulation is valid and a second daily period where the second formulation is valid. The time of the transition between the two daily periods is fixed, for example, as the time halfway the first and the second time. In case a third formulation is entered at a third time, a third daily period can be reserved for that formulation. If the third time precedes the first and the second time, the third daily period ends, for example, at a time halfway between the third time and the next registered time for the user mentioned. If the third time is between the first and the second time, the third daily period begins, for example, at an intermediate time between the first and the third time. The third daily period then ends, for example, at an intermediate time between the third and the second time.

A third embodiment of a control unit for an automatic device for preparing a beverage is provided with a display panel and an input means which enables a user by means of designations of image elements shown on the display panel to choose from a plurality of formulations a formulation for the beverage to be prepared, wherein the control unit is furthermore provided with an operating unit for displaying by means of the display panel a visually observable reaction to designations provided by the user, and for controlling a preparation unit of the automatic device, wherein the display panel has hierarchically interrelated selection fields which are representative of a formulation of the beverage to be prepared, with at least one selection field of a first, highest, level and at least two selection fields of a second, lower, level, wherein each lower ranked selection field is representative of a further specification of the formulation specified by the associated higher ranked selection field, and wherein the display panel after designation of a selection field displays the designated selection field's immediate lower ranked selection fields associated with the designated selection field.

In a corresponding method for controlling an automatic device for preparing a beverage, a user is enabled by means of designations of image elements shown to choose from a plurality of formulations a formulation for the beverage to be prepared, wherein a visually observable reaction to designations provided by the user is given, wherein selection fields are shown, wherein hierarchically interrelated selection fields are shown which are representative of a formulation of the beverage to be prepared, with at least a selection field of a first, highest, level and at least two selection fields of a second, lower, level, wherein each lower ranked selection field is representative of a further specification of the formulation specified by the associated higher ranked selection field, and wherein after designation of a selection field the designated selection field's immediate lower ranked selection fields associated with the designated selection field are displayed.

The highest level selection field is, for example, representative of the specification 'beverage'. The hierarchically directly lower selection fields are representative of a basic composition of the beverage, e.g., "cappuccino", "latte macchiato", "café crème", and hence representative of a further specification. These selection fields in turn can be associated with, relative to them, directly lower selection fields which are representative of the addition of sugar or an aroma. This embodiment of the invention gives the user clear information on the formulation of the beverage that has been specified so far, and at the same time is surprising in that the control unit after each selection expands the depicted image further and further until a final composition has been reached.

If desired, after designation of a lowest level selection field the control unit can proceed directly to initiate the preparation of the beverage composed. Alternatively, there may be provided a separate activation field for activating the preparation.

In a variant of the third embodiment of the control unit, the display panel, after designation of a selection field, continues to display the associated higher level selection fields as well.

The control unit may be provided furthermore with detection means, which detection means upon detection of presence of a user deliver a signal which causes the hierarchically highest level selection field to be displayed. This mode has the advantage that the display panel is not needlessly active when there are no users in the vicinity, while yet there is immediately a display when a user approaches the device. Moreover, this is experienced by the user as surprising.

In an embodiment the hierarchically highest selection field is shown permanently during operation. In another embodiment, the control unit may, for example, be provided with a key, touching of which results in the hierarchically highest selection field being shown.

Naturally, such detection means may also be provided in one of the other embodiments of the device and cause a menu to be displayed upon a user approaching the device.

A fourth embodiment of a control unit according to the invention for an automatic device for preparing a beverage is provided with a display panel and an input means which enables a user by means of designations of image elements shown on the display panel to choose from a plurality of formulations a formulation for the beverage to be prepared, wherein the control unit is provided furthermore with an operating unit for displaying by means of the display panel a visually observable reaction to designations provided by the user, and for controlling a preparation unit of the automatic device, wherein the display panel has selection fields for mutually exclusive settings for formulations of the beverage to be prepared, wherein the control unit enables the user by designation of one of the selection fields to select one of the settings, wherein a collecting field with at least one setting field shows the chosen setting of the formulation, and wherein the non-designated selection fields remain visible and selectable. In this embodiment, the display panel during operation shows an elongate collecting field with mutually juxtaposed setting fields for the formulation of the beverage to be prepared, and transversely to the collecting field an associated series of selection fields for these settings, wherein designating a selection field has as a result that the respective setting of the setting field associated with the designated selection field is replaced with the alternative setting belonging to the selection field and the image shown in that selection field is displayed in the respective setting field.

In a corresponding method for controlling an automatic device for preparing a beverage, a user is enabled by means of designations of image elements shown to choose from a plurality of formulations a formulation for the beverage to be prepared, wherein a visually observable reaction to designations provided by the user is given, wherein selection fields are shown, wherein the user is enabled through designation of one of the selection fields to select one of the formulations, wherein in a collecting field with at least one setting field the chosen setting of the formulation is shown, and wherein the non-designated selection fields remain visible and selectable, wherein an elongate collecting field is shown with mutually juxtaposed setting fields for the formulation of the beverage to be prepared, and transversely to the collecting field shows an associated series of selection fields for these settings, wherein designating a selection field has as a result that the respective setting of the setting field associated with the designated selection field is replaced with the alternative setting belonging to the selection field and the image shown in that selection field is displayed in the respective setting field.

The mutually juxtaposed setting fields in the collecting field give the user at a single glance an overview of the settings for the formulation of the beverage to be prepared. The setting fields may be arranged, for example, on a horizontal or a vertical line. At the same time, the selection fields arranged laterally thereof show what alternatives are possible. Also after the user has made a selection between mutually exclusive settings for the formulations, for example, the selection "hot water", the settings thereby excluded, e.g., "coffee" or "hot chocolate", remain visible and selectable. Accordingly, after an error, or in case of doubt, the user can rapidly select another beverage.

In a further elaboration of the fourth embodiment mentioned, the setting fields are displayed with an enhanced contrast and/or brightness compared to the selection fields.

The collecting field and the setting fields present therein may, for example, be recognizable for the user in that they have a fixed position on the display panel, for example, on an imaginary line through the center. By displaying the setting fields situated in the collecting field in a marked fashion with a higher contrast and/or brightness, the choice made is visible still better.

In a further elaboration of the fourth embodiment, the setting fields are arranged on a connecting element which extends through the collecting field.

The connecting element clearly indicates to the user that the setting fields arranged on it jointly determine the formulation of the beverage to be prepared. This feature can be used separately from or in combination with the earlier features for marking the setting fields. The setting fields can, for example, partly hide the connecting element, so that it seems as if the connecting element extends behind the setting fields.

In a variant of this further elaboration, the connecting element shown extends from the collecting field in the direction of a beverage outlet for pouring the beverage after preparation.

As a result, it is still clearer for the user that the composition of the beverage to be prepared is determined by what is shown in the collecting field.

In a further variant of that variant, there is furthermore provided an activation field for starting the preparation of the beverage, which activation field is placed on the connecting element between the collecting field and an end point of the connecting element which extends to the beverage outlet.

These variants are also possible in the first embodiment of the invention.

This location of the activation field promotes an intuitive operation of the control unit. As the activation field is placed on the connecting element between the collecting field indicating the formulation of the beverage and the end point of the connecting element extending to the beverage outlet where the beverage is to be poured, the user easily understands the decisive function of the collecting field.

An automatic device according to the invention for preparing a beverage is provided with a control unit according to any one of the above described embodiments.

BRIEF DESCRIPTION OF THE DRAWINGS

These and other aspects according to the invention are elucidated in more detail on the basis of the drawings. In the drawings.

DESCRIPTION OF THE EXEMPLARY EMBODIMENTS

Figure 1:
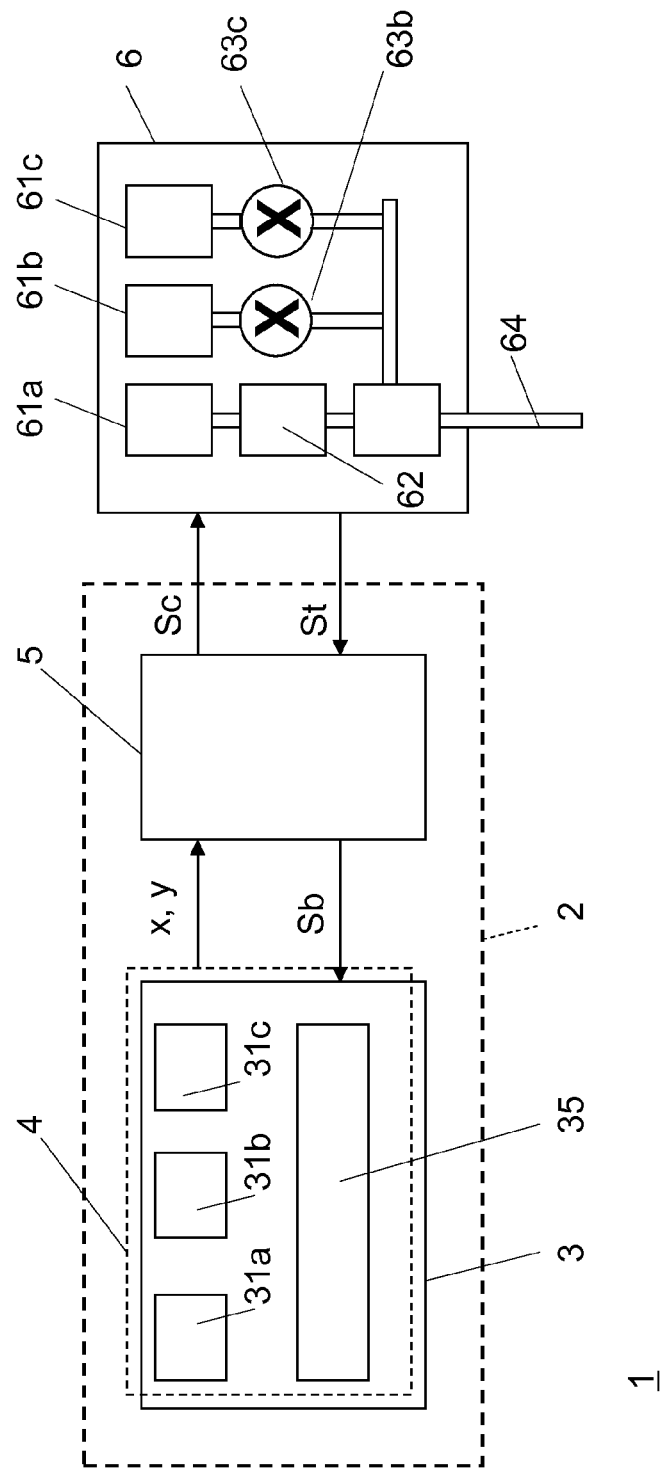
FIG. 1 shows schematically a device provided with a first embodiment of a control unit according to the invention.

In the following detailed description numerous specific details are set out to provide for a thorough understanding of the present invention. It will be clear to the skilled person that these details are not essential to the present invention. In other instances, generally known methods, procedures and components are not described in detail to thereby avoid more essential aspects of the invention being veiled.

It will be clear to the skilled person that the terms "first", "second", "third" in this description can be used to distinguish parts from each other, without thereby indicating any priority. Hence, a first element, component, area, field, module, etc., could also be called a second element, component, area, field, module, etc., without departing from the scope of protection of the present application.

In the drawings, parts are normally not shown to scale. In some instances, parts are shown in a magnified representation for clarity.

Unless indicated otherwise, all terms have the meaning given to them by the person skilled in the art of the present invention. Further, terms such as they are defined in commonly used reference works and dictionaries are understood to be interpreted in accordance with their meaning in the context of the technical field relevant in this case and not to be interpreted in an idealized or unduly formal sense, unless expressly indicated otherwise. In the event of a difference in interpretation of a term, the interpretation given to it by the present application shall be decisive.

Corresponding parts have mutually corresponding reference numerals.

FIG. 1 shows schematically an embodiment of an automatic device 1 for preparing a beverage. The device 1 is provided with a preparation unit 6 and with a control unit 2. The preparation unit 6 is configured for preparing a beverage according to a formulation that can be chosen from a plurality of formulations. The preparation unit 6 can prepare, for example, a plurality of beverages such as water, tea, coffee, chocolate milk and soup. In a practical embodiment, the beverages can be provided with additions, such as sugar, milk and aromas. If desired, also a temperature of the beverage to be poured can be set. In an embodiment, the preparation unit 6 is provided with inter alia holders 61a, 61b, 61c for storage of coffee, sugar and milk, and the like. The embodiment shown is furthermore provided with a heating unit 62, dosing valves 63b, 63c and a beverage outlet 64.

The control unit 2 is provided with a display panel 3 and an input means 4 which enables a user by means of designations of image elements shown on the display panel 3 to choose from a plurality of formulations a formulation for the beverage to be prepared. In the embodiment shown, the input means 4 is a transparent touch-sensitive panel which is arranged on the display panel 3. Upon touching, the input means 4 delivers a position signal x, y, which is indicative of the position where the display panel 3 has been touched. In another embodiment, the user is enabled to designate a position on the display panel in a noncontact manner, for example, by pointing at that position, or by giving spoken commands.

The control unit 2 is furthermore provided with an operating unit 5 for displaying by means of the display panel 3 a visually observable reaction to designations provided by the user, and for controlling the preparation unit 6 of the automatic device 1. To this end, the operating unit 5 receives the position signal x, y from the input means, and the operating unit 5 controls the display panel with an image signal Sb. The operating unit 5 controls the preparation unit with control signals Sc. In addition, the operating unit 5 can receive condition signals St from the preparation unit 6 which are indicative of the condition of the preparation unit. The condition signals St can indicate, for example, the filling degree of the holders 61a, 61b, 61c, or the height of a temperature reached by the heating unit 62.

The display panel 3 has selection fields 31a, 31b, 31c for mutually exclusive settings for formulations of the beverage to be prepared. Mutually exclusive settings are, for example, the selection "coffee", "tea", "chocolate milk". During operation, these selection fields are made knowable to the user in that in them a text or an image is shown which is representative of the associated setting. The control unit 2 enables the user to select one of the settings through designation of one of the selection fields, e.g., 31b. After the selection has taken place, a collecting field 35 with at least one setting field shows the chosen setting of the formulation. The non-designated selection fields, 31a, 31c, then remain visible and selectable. As a result, in contrast with existing devices, the user can easily change a choice even if a selection has already been made.

Figure 2:
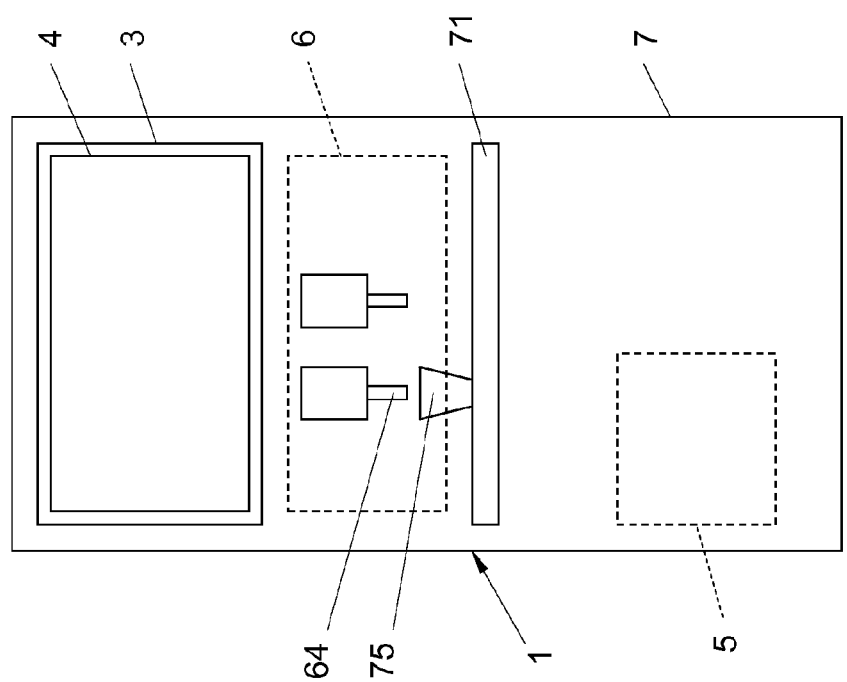
FIG. 2 shows schematically a front view of the device.

FIG. 2 shows a practical setup of components of the automatic device. Parts therein that correspond to those from FIG. 1 have the same reference. In the practical embodiment shown, the device has a housing 7 for the parts shown in FIG. 1. The housing 7, furthermore, has a support 71 for supporting a beaker 75. The beaker 75 can be placed there, for example, by the user or by a placing mechanism.

Figure 3:
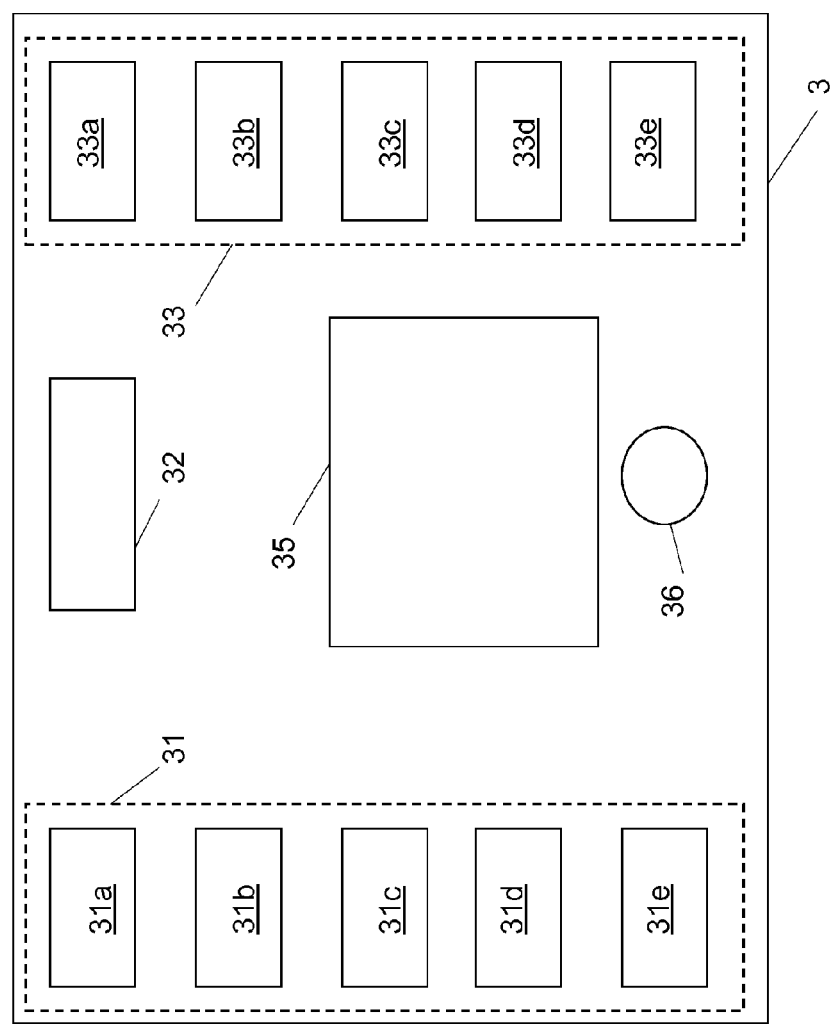
FIG. 3 shows schematically a display in the first embodiment.

FIG. 3 shows schematically an overview of the available selection fields in an embodiment of the control unit. The selection fields comprise a first series 31 of selection fields 31a, . . . , 31e with which a basic composition can be chosen from, for example, "hot water", "café crème", "cappuccino", "latte macchiato" and "espresso". These are mutually exclusive settings. During operation, the display panel shows a representation of the respective basic compositions in or next to the selection fields. By designating one of the selection fields 31a, . . . , 31e, in this case by touching of the respective selection field, the respective basic composition is selected, and the selection is visualized in the collecting field 35. The choice of one of the basic compositions excludes the other basic compositions. However, the non-designated selection fields remain visible and selectable. In the embodiment shown, the selection fields comprise a further selection field 32, with which a dosing can be adjusted, for example, the dosage of an amount of coffee. The change in the composition of the beverage to be prepared by designation of this selection field is visualized in the collecting field 35. The selection fields comprise a second series of selection fields 33a, . . . , 33e, designation of which results in the addition of an aroma to the beverage to be prepared, such as "chocolate-mint", "hazelnut", "caramel", "toffee-nut" and "vanilla".

Figure 4:
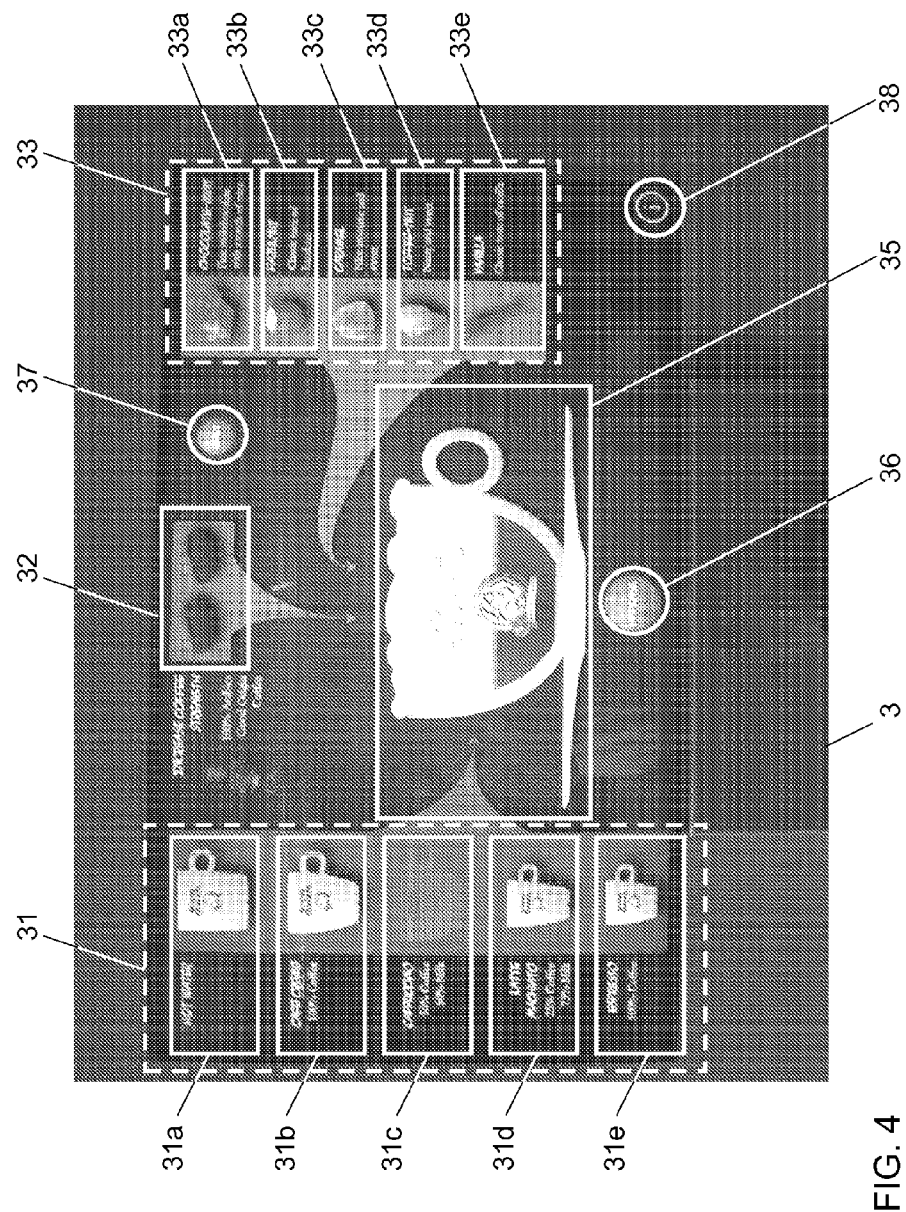
FIG. 4 shows a more concrete display in the first embodiment.

FIG. 4 shows a possible display of display panel 3 in a practical embodiment. Parts in it that correspond to those from FIG. 3 have the same reference. FIG. 4 shows the display in the situation where the user has designated the selection field 31c from the series 31, thereby making the exclusive selection of cappuccino. In the display shown, this is made clear in that in the collecting field 35 the cup of selection field 31c is shown. At the same time, the image in the selected selection field 31c is displayed with a lower contrast, thereby giving the user the impression that the cup has been moved from the selection field 31c to the collecting field 35. The other selection fields 31a, 31b, 31d and 31e remain visible after this selection and moreover selectable. Accordingly, the user can simply change his choice by designating a different selection field. In an embodiment, the control unit 2 enables the user first to confirm a choice he has made, by making a dragging movement from the designated selection field, e.g., 31c, to the collecting field 35. This may be accompanied by a displacement visible on the display panel, of the image element shown in the selection field 31c to the collecting field 35. This provides a still clearer insight into the use of the device because it seems to the user as if he/she is in actual fact taking a cup from a shelf.

Analogously, the user can adjust the composition of the beverage after selection of a basic composition by designating other selection fields 32, 33a, . . . , 33e, whereby, after designation, the modified composition of the beverage to be prepared becomes visible in that the component shown in the respective selection field becomes visible in the collecting field 35. Here too, in an embodiment, the user can be enabled to confirm a choice by means of a dragging movement, by performing a dragging movement from the desired selection field to the collecting field 35, while in that case too, in an embodiment, the dragging movement is accompanied by a displacement of the selected component that is visible on the display panel.

In an embodiment, the selection of a basic composition, or of a component to be added to the basic composition, is accompanied by an associated sound, e.g., the sound of putting down a cup upon selection of a basic composition, or the sound of pouring upon addition of milk.

In the exemplary embodiment shown, the display panel shows additional image elements in further fields 36, 37, 38. Field 36 is an activation field. Designation of this field results in the actual preparation and pouring of the beverage shown in the collecting field 35. Field 37 is a reset field. Designation of this field brings the control system into the initial condition. Field 38 is an information field. Designation of this field 38 results in an information image being shown that offers the user information about the possibilities of the device. The possibilities can comprise, for example, the use of the display panel as a notation board, the use of the display panel for displaying news items, weather reports and traffic information.

In an embodiment, the device is further provided with one or more cameras. The one or more cameras can serve, for example, as input means, with the one or more cameras being coupled to an image processing unit capable of establishing a position designated by the user on the display panel. Two or more devices according to the invention provided with camera(s) may be coupled with each other, as a result of which users of devices set up at mutually remote distances are able to see each other and to communicate with each other.

Figure 5A:
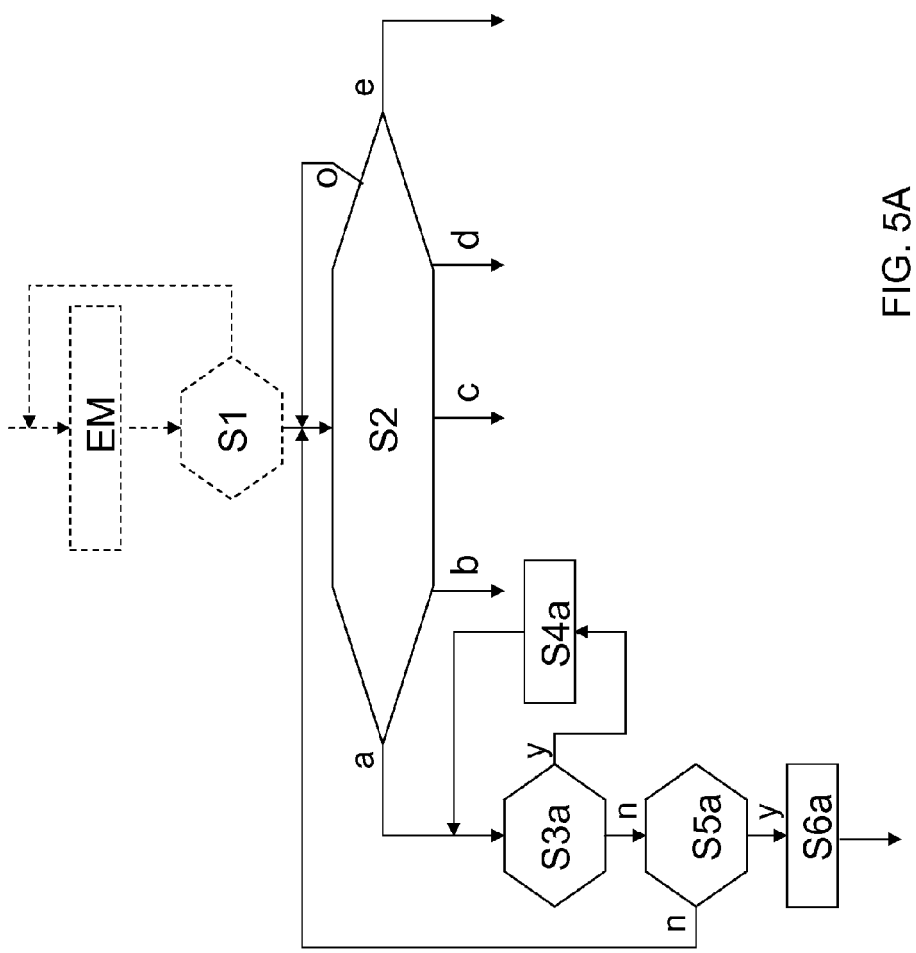
FIG. 5A shows a first part of a method according to the first embodiment.
Figure 5B:
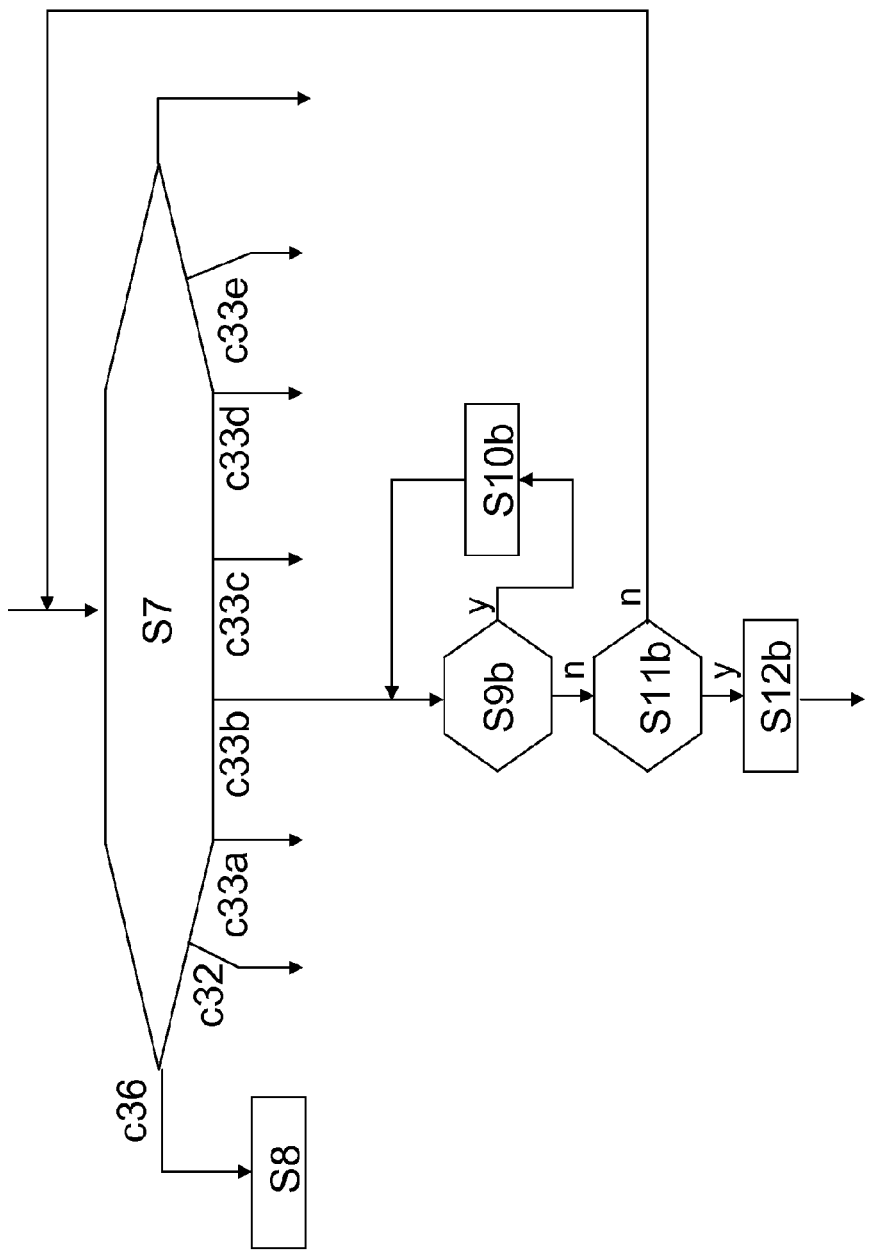
FIG. 5B shows a second part of a method according to the first embodiment.

FIG. 5A shows a possible manner of operation of a control unit 2 as described with reference to FIGS. 3 and 4. In the embodiment shown, the device has an eco mode EM, in which the display panel is off. In a first step S1 the control unit 2 detects that activation is required, for example, through a user operating a switch, by sensing a user approaching the device 1 or by sensing the user making a sound. Upon activation, the control unit enters an active mode in which it waits for input from the user. In step S2 it is verified whether the user has designated one of the selection fields 31a, . . . , 31e. In the flow diagram of FIG. 5A the paths a through e respectively correspond with a designation of the selection fields 31a through 31e. As long as no selection field has been designated, indicated as selection "o", step S2 is repeated. After a selection field has been designated, the control unit 2 detects whether a dragging movement is being performed from the designated selection field. Suppose now that selection field 31a has been designated. For the other selection fields, the procedure has a corresponding course. In step S3a the control unit 2 detects whether the dragging movement is still taking place. If that is the case, "y", the image element of the selection belonging to the selection field, for example, the image element of a cup of water in the case of selection of selection field 31a is displayed S4a at the point where the dragging movement has led to so far. When the dragging movement has ended, option "n" of step S3a, it is verified in step S5a whether the dragging movement has ended in the collecting field 35. If this is the case, the choice that is associated with the designated selection field 31a is interpreted as confirmed and this is displayed S6a by the image element of selection field 31a in the collecting field 35. By way of alternative, or in addition, this can also be confirmed by displaying this image element less visibly, or not at all, in selection field 31a. The image may be less visible, for example, by displaying it with reduced contrast or lower brightness. Also, the respective image element may be displayed, for example, in a reduced representation. Instead of monitoring in the steps S3a, S4a and S5a whether a dragging movement to the collecting field 35 has taken place, this may be confined, in another embodiment, to verifying whether a selection field has been designated. After a basic composition has been designated the user is enabled to refine the formulation, as shown in FIG. 5B. In step S7 it is verified whether the user wants a refinement of the composition or that only the selected basic composition is desired. In the latter case, the user designates selection field 36, after which the flow diagram follows path c36 and in step S8 a beverage according to the selected basic composition is prepared.

Alternatively, the user can select an addition by designation of a respective selection field. In the flow diagram shown in FIG. 5B the selection fields 32 and 33a through 33e correspond in succession with the paths c32 and c33a through c33e. The steps followed by the control unit 2 have been demonstrated by way of example for the case where the user indicates with the aid of selection field 33b that he/she wishes to add hazelnut. After this choice, path c33b in the flow diagram is followed, after which in step S9b it is verified whether the user is performing a dragging movement. If this is the case (y), the progress of the dragging movement is displayed by displaying the associated image element of selection field 32b on the display panel (Step S10b) at the instantaneous position of the dragging movement. If the dragging movement has stopped (n), it is verified in step S11b whether the dragging movement has ended in the collecting field. If that is the case, branch "y" of step S11b, the respective component is added in step S12b to the formulation of the beverage to be prepared. If that is not the case, branch "n" of step S11b, nothing is changed in the formulation. In both cases the procedure then goes on with step S7, in which the user can indicate a new component for addition to the formulation, or can initiate the preparation of the beverage with the then valid formulation.

For the other selection fields 32 and 33a, 33d-33e the procedure proceeds similarly to the procedure for 33b.

Figure 6:
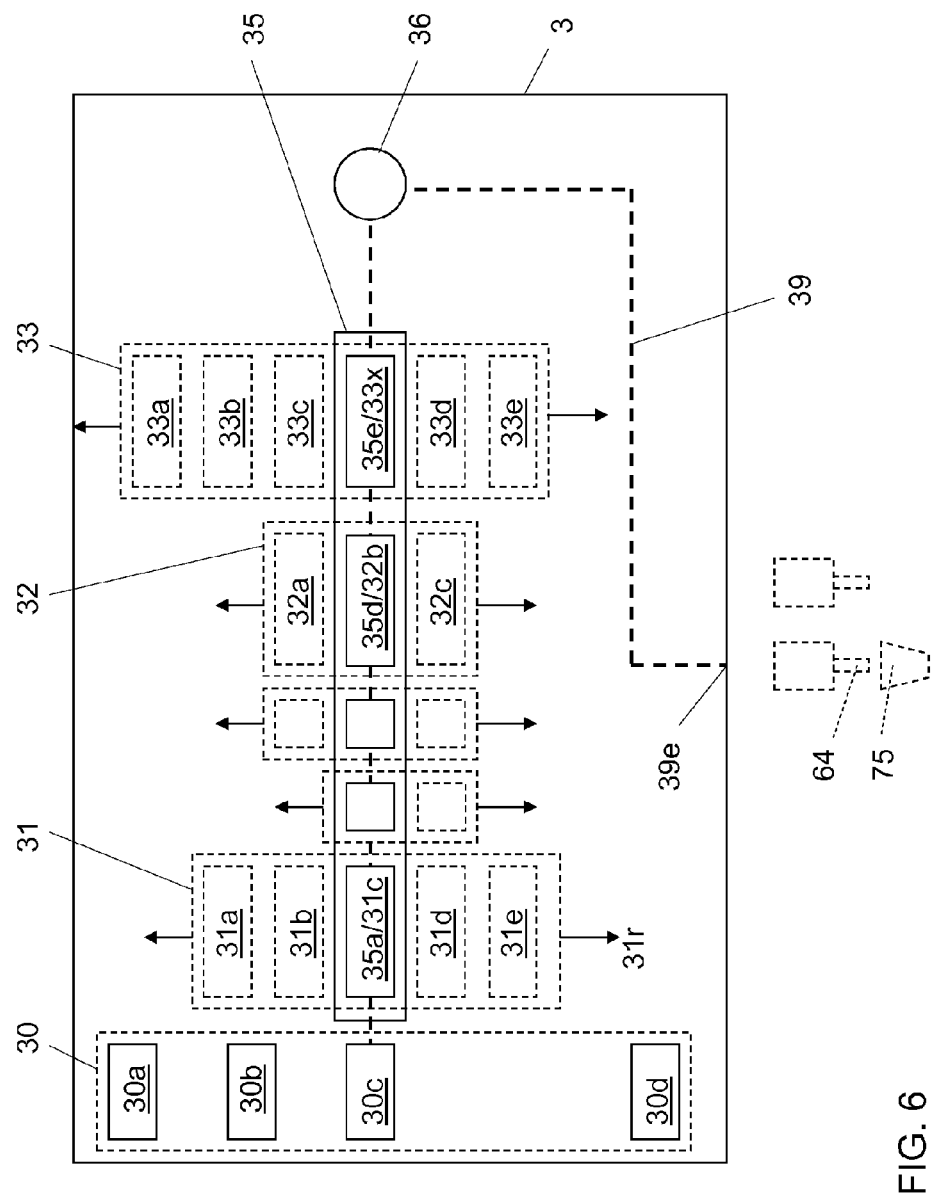
FIG. 6 shows schematically a display in a second embodiment of a control unit according to the invention.

FIG. 6 shows a possible display of a display panel 3 in a second embodiment of a control unit 2 according to the invention. The display panel 3 here shows a main menu 30 with fields 30a, 30b, 30c, 30d. The main menu 30 enables the user to choose a beverage with a single designation. Designation of field 30a results, for example, in strong coffee being poured. Designation of field 30d results in chocolate milk being poured and designation of field 30b results in the pouring of a beverage of a composition selected on a randomized basis. In this case field 30c has been designated, with the control unit 2 enabling the user himself to compose the beverage to be prepared.

The display panel 3 in that case shows an elongate collecting field 35 with mutually juxtaposed setting fields 35a, 35d, 35e for the formulation of the beverage to be prepared. Each of the setting fields 35a, 35d, 35e shows an aspect of the currently selected composition. Further, the display panel 2 shows series 31, 32 and 33 of selection fields transversely to the collecting field 35. Of each series, one of the selection fields coincides with a respective setting field. The other selection fields are located next to the setting field and can be used to select an alternative setting. The series 31, 32 and 33 are respectively associated with the setting fields 35a, 35d and 35e. Transversely to the collecting field 35 the display panel shows, for example, a first series 31 of selection fields 31a, 31b, 31c, 31d, 31e, of which selection field 31c in this display coincides with setting field 35a. Transversely to the collecting field 35 there is shown a second series 32 of selection fields 32a, 32b, 32c, of which selection field 32b in this display coincides with setting field 35d. Further, the display panel 3 shows transversely to the collecting field 35 a third series 33 of selection fields 33a, 33b, 33c, 33d, 33x and 33e, of which selection field 33x in this display coincides with setting field 35e. In addition, the collecting field 35 has still other setting fields and associated selection fields, which are not further elucidated in more detail here. In the situation shown, the user has just designated selection field 31c from the series 31, so that the respective setting is taken over by the setting field 35a. If the user designated a different selection field, for example, selection field 31b, this would have as a result that the respective setting of the setting field 35a associated with the designated selection field 31b is replaced with the alternative setting belonging to the selection field 31b and the image shown in that selection field 31b is represented in the respective setting field 35a. In practice, this can be made knowable to the user in that the whole column of selection fields 31 is displaced in the direction 31r until selection field 31b coincides with setting field 35a. Should the display panel 3 not provide sufficient space to display the whole series in the same order after this displacement, the selection fields can be displayed, for example, in a rotating fashion. In that case, the new order is 31e, 31a, 31b, 31c, 31d.

In the embodiment described here, the setting fields 35a, 35d, 35e are displayed with enhanced contrast compared to the (non-selected) selection fields. In this way, it is clear to the user at a single glance what settings have been chosen. This is still clearer in that in the display shown the setting fields 35a, 35d, 35e are arranged on a connecting element 39 which extends through the collecting field 35. The connecting element 39 is shown as an elongate element, here in the form of a curve with straight line sections. Alternatively, it may be represented as a flowing curve, or as a tube instead of a line.

In this embodiment, the connecting element 39 shown extends from the collecting field in the direction of a beverage outlet 64 for pouring the beverage after preparation. This clarifies the interrelation between the collecting field 35 and the beverage outlet 64. If there is more than one beverage outlet, it can be indicated in this manner where the beaker or cup is to be placed.

The activation field 36 for starting the preparation of the beverage is placed on the connecting element 39 between the collecting field 35 and an end point 39e of the connecting element 39 which extends to the beverage outlet 64.

Figure 7:
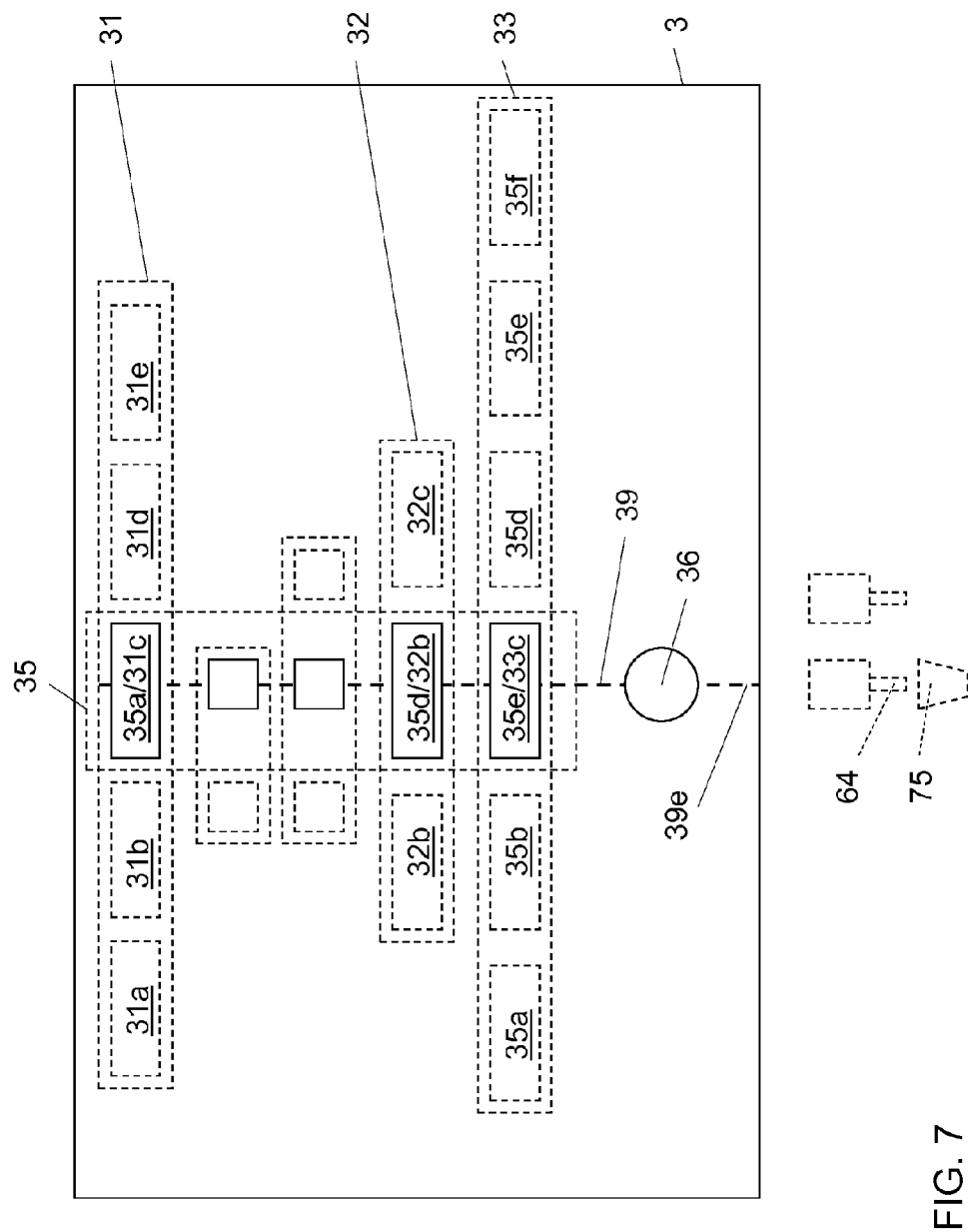
FIG. 7 shows schematically a display in a variant of the second embodiment of a control unit according to the invention.

FIG. 7 shows a variant of the embodiment of FIG. 6. In this variant, the collecting field 35 and the connecting element 39 extend in vertical direction. Associated with the setting fields 35a, 35d and 35e are series 31 of selection fields. The selection fields, e.g., 31a through 31e are arranged next to each other in a horizontal direction. The selection field (e.g., 32b) coinciding with each setting field (e.g., 35d) reflects the currently valid setting.

Figure 8:
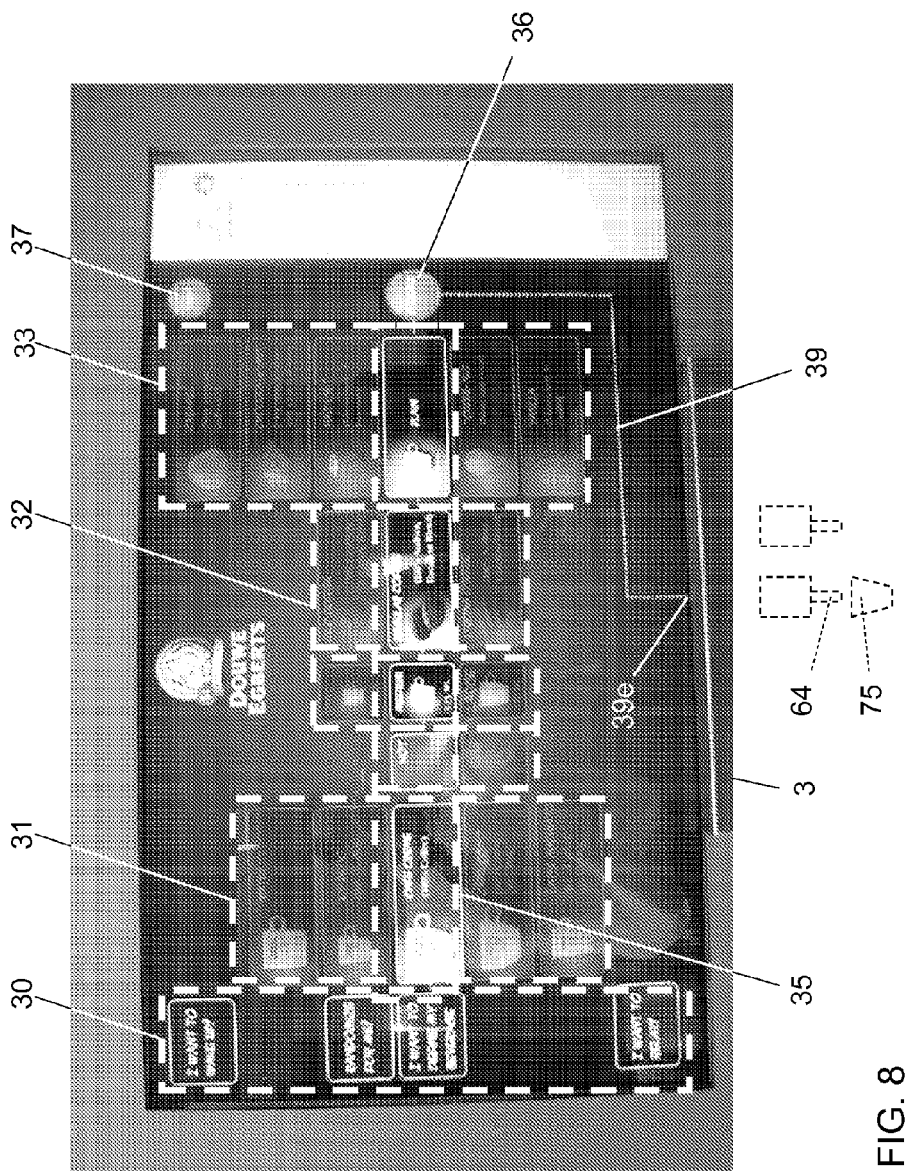
FIG. 8 shows a more concrete display of the embodiment shown in FIG. 6.

FIG. 8 shows a possible display of display panel 3 in the embodiment of FIG. 6.

Main constituents in this display are indicated by means of dashed boxes.

No. 30 is the main menu. In it, in respective selection fields the following options are shown to the user. "I want to wake up", "Randomize for me", "I want to define my beverage" and "I want to relax".

A second column of selection fields 31 offers a choice from five kinds of beverage: "water", "espresso", "café crème", "cappuccino" and "latte macchiato".

A third column of selection fields, not numbered, offers a choice of a temperature of the beverage to be prepared, viz., hot or cold.

A fourth column of selection fields, not numbered either, offers the option, when coffee has been selected as beverage, of setting the strength thereof.

A fifth column of selection fields 33 offers the possibility of adding aromas to the beverage to be prepared.

A third embodiment will be described below on the basis of FIGS. 9A, 9B, 9C and FIG. 10.

As in the other embodiments, the control unit (not shown) is provided with a display panel 3 and an input means 4, in the form of a transparent touch-sensitive panel on the display panel, which enables a user by means of designations of image elements shown on the display panel 3 to choose from a plurality of formulations a formulation for the beverage to be prepared. The control unit is then provided with an operating unit (not shown) for displaying by means of the display panel 3 a visually observable reaction to designations provided by the user, and for controlling a preparation unit 6 of the automatic device. As these aspects have already been described with reference to FIGS. 1 and 2, they are left aside here.

Figure 9A:
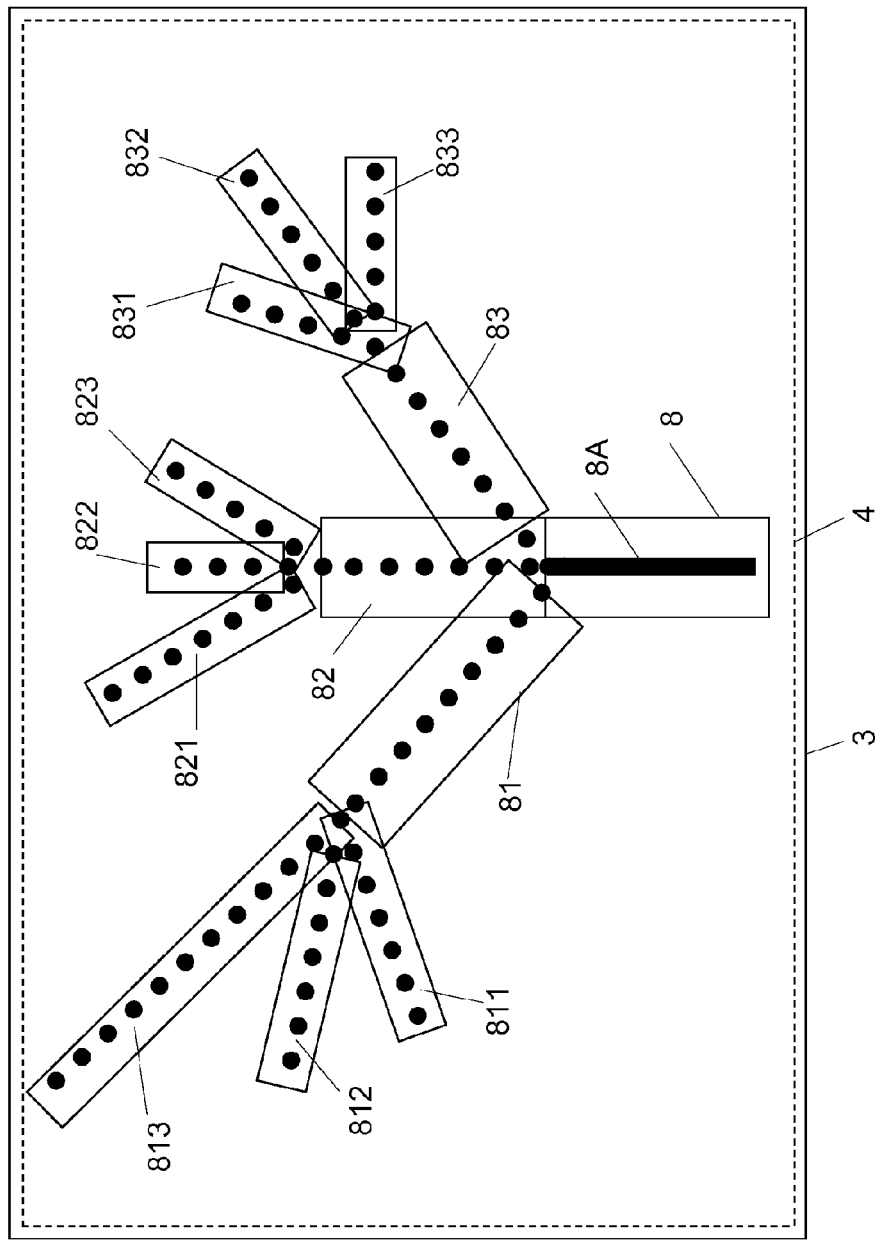
FIG. 9A shows schematically a first display of a display panel of a third embodiment of a control unit according to the invention.

FIG. 9A shows schematically a display of a display panel 3 in the third embodiment mentioned. In this embodiment, the display panel 3 has hierarchically interrelated selection fields 8, 81, 82, 83, etc., which are representative of a formulation of the beverage to be prepared. The selection fields comprise at least one selection field 8 of a first, highest, level and at least two selection fields of a second, lower, level, here being the selection fields 81, 82, 83. Each lower ranked selection field is representative of a further specification of the formulation specified by the associated higher ranked selection field.

In the embodiment shown, the highest level selection field 8 is representative of the generic specification 'beverage'. The hierarchically directly lower selection fields 81, 82, 83 are representative of a basic composition of the beverage, e.g., "cappuccino", "latte macchiato", "café crème", and hence representative of a further specification. Each of these hierarchically directly lower selection fields 81, 82, 83 in turn has hierarchically directly lower selection fields. Selection field 81 has the hierarchically directly lower selection fields 811, 812, and 813. Selection field 82 has the hierarchically directly lower selection fields 821, 822 and 823, and selection field 83 has the hierarchically directly lower selection fields 831, 832 and 833. The hierarchically lowest selection fields are representative of, for example, the addition of sugar or an aroma.

The selection fields may be represented by the display panel with image elements. In this figure and following figures, visualized image elements are denoted with a solid line section and hidden image elements are denoted with a dotted line section. In the display shown, therefore, only the highest-level selection field 8 with its image element 8A is represented. The image element 8A, for example, may be displayed permanently as a sign that the device is ready for use, or may be displayed at the moment when a user approaches the device, or activates the device in another manner, for example, with a sound signal or by pressing a key.

Figure 9B:
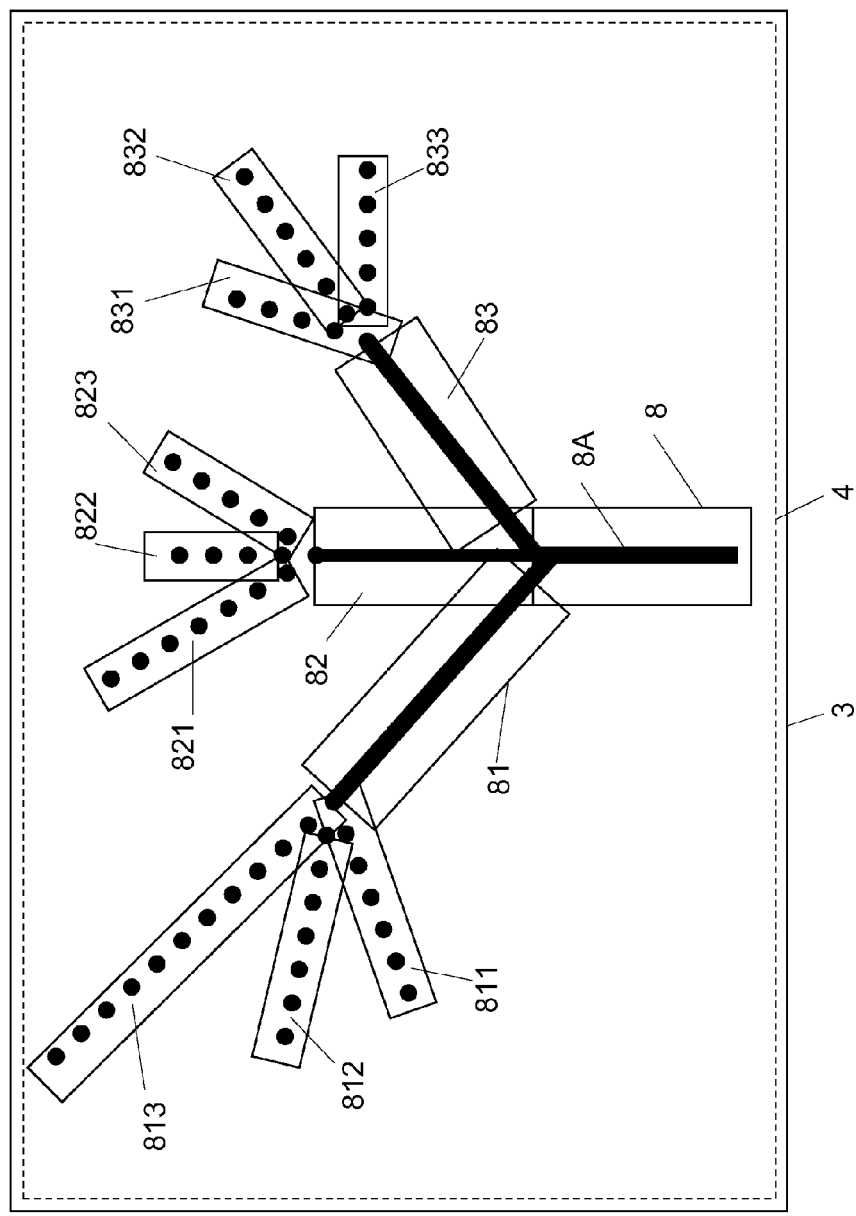
FIG. 9B shows schematically a second display of a display panel of a third embodiment of a control unit according to the invention.
Figure 9C:
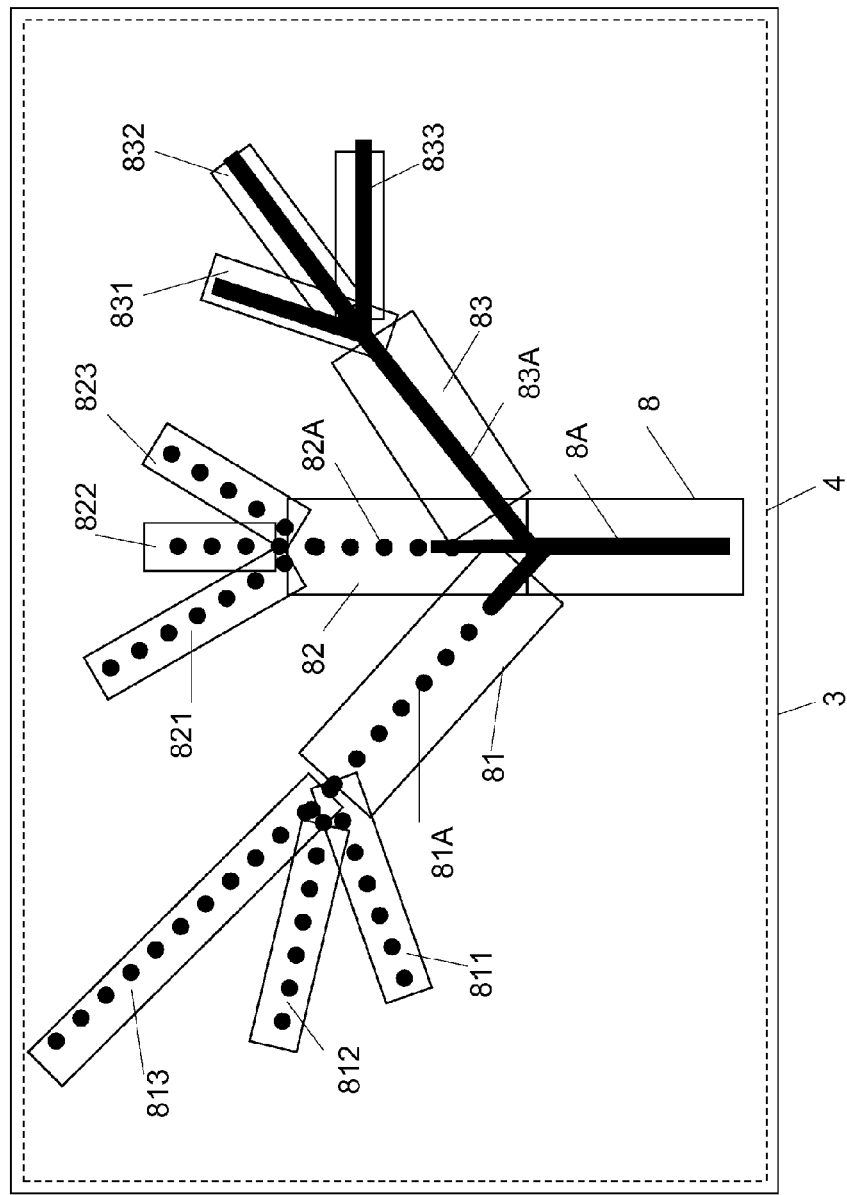
FIG. 9C shows schematically a third display of a display panel of a third embodiment of a control unit according to the invention.

After the user has designated the highest-level selection field 8 represented by image element 8A, the control unit causes the display panel 3 to display the directly lower ranked selection fields 81, 82 and 83. This is shown in FIG. 9B. In addition, the control unit causes the display panel to continue displaying the designated selection field 8 as well as any associated higher level selection fields. In this case, selection field 8 is the hierarchically highest selection field and therefore there are no higher level selection fields associated with this selection field 8. The directly lower ranked selection fields 81, 82, and 83 enable a choice between different basic compositions, e.g., "cappuccino", "latte macchiato", and "café crème". After the user has designated one of the selection fields 81, 82, 83, e.g., 83, a situation as shown in FIG. 9C arises. There, the control unit causes the display panel 3 to display the directly lower ranked selection fields 831, 832 and 833 associated with the designated selection field 83, in addition to the hierarchically higher level selection fields that had already been displayed. The user can now complete the specification of the beverage to be prepared by designating one of these hierarchically lowest level selection fields 831, 832 and 833. In an embodiment, this embodiment leads to immediate initiation of the preparation of the specified beverage. In another embodiment, a separate confirmation of the user is required, for example, by designation of an activation field.

In the embodiment shown, after the choice of selection field 83, the options thereby excluded (selection fields 81 and 82) are displayed as such. Here, this is the case in that the branches 81A, 82A, which form the image elements in these selection fields 81, 82, are shown truncated. In an embodiment, the user can still make the choice of one of these excluded selection fields possible by designating the hierarchically higher level selection field 8.

Figure 10:
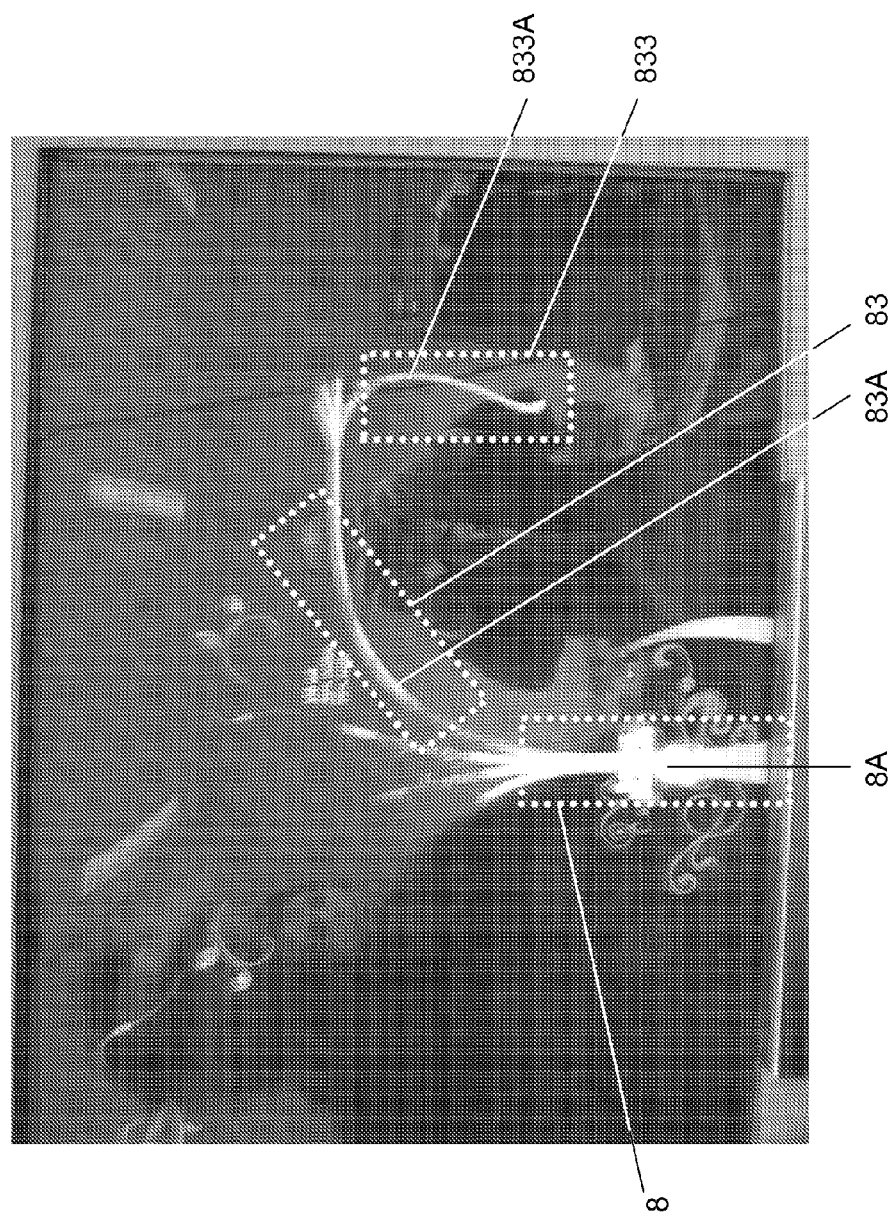
FIG. 10 shows an example of a concrete display of a display panel in the third embodiment of the control unit according to the invention.

FIG. 10 shows a typical display. In it, the display panel represents with a trunk 8A as image element the hierarchically highest selection field 8, with a branch 83A the hierarchically directly lower selection field 83, and with a branch 833A the hierarchically lowest selection field 833.

Figure 11:
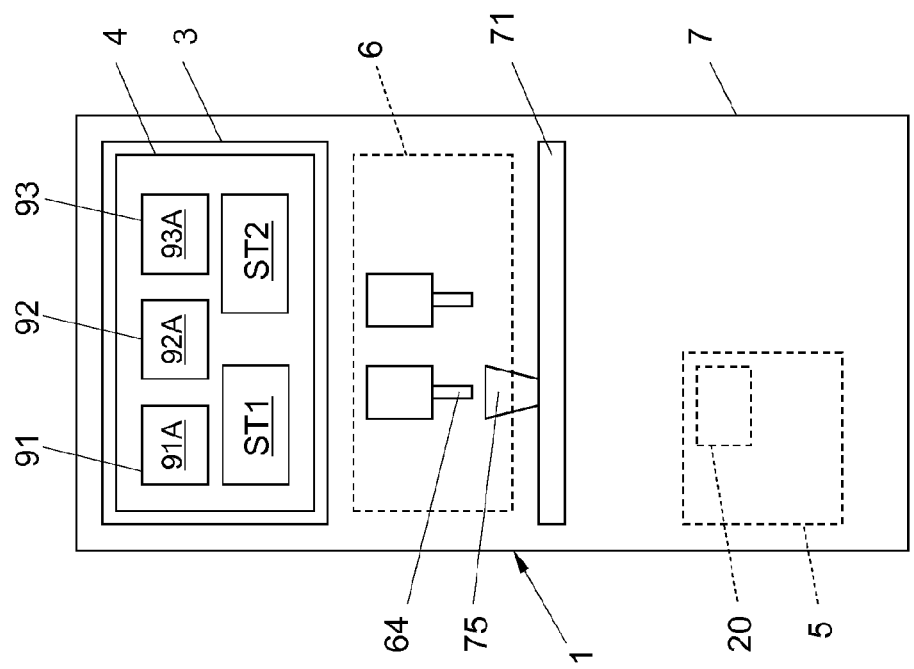
FIG. 11 shows schematically a front view of a device provided with a fourth embodiment of a control unit according to the invention.

FIG. 11 shows an automatic device 1 for preparing a beverage with a fourth embodiment of the control unit 2. As in the embodiments shown above, the control unit 2 is provided with a display panel 3 and with an input means 4 enabling the user by means of designations of image elements shown on the display panel to choose from a plurality of formulations a formulation for the beverage to be prepared. Also, the control unit 2 is provided with an operating unit 5 for displaying by means of the display panel 3 a visually observable reaction to designations provided by the user, and for controlling a preparation unit 6 of the automatic device. During operation, the display panel 3 shows a plurality of image elements 91A, 92A, 93A, which coincide with selection fields 91, 92, 93, respectively. In the exemplary embodiment shown there are three selection fields. In practice, the number of selection fields may be widely divergent, ranging, e.g., from 2 to 30. The control unit 2 is equipped with a clock unit 20 for establishing the time, and a formulation for a beverage to be prepared is jointly determined by the selection of a selection field and a time established by the clock unit 20.

Figure 12:
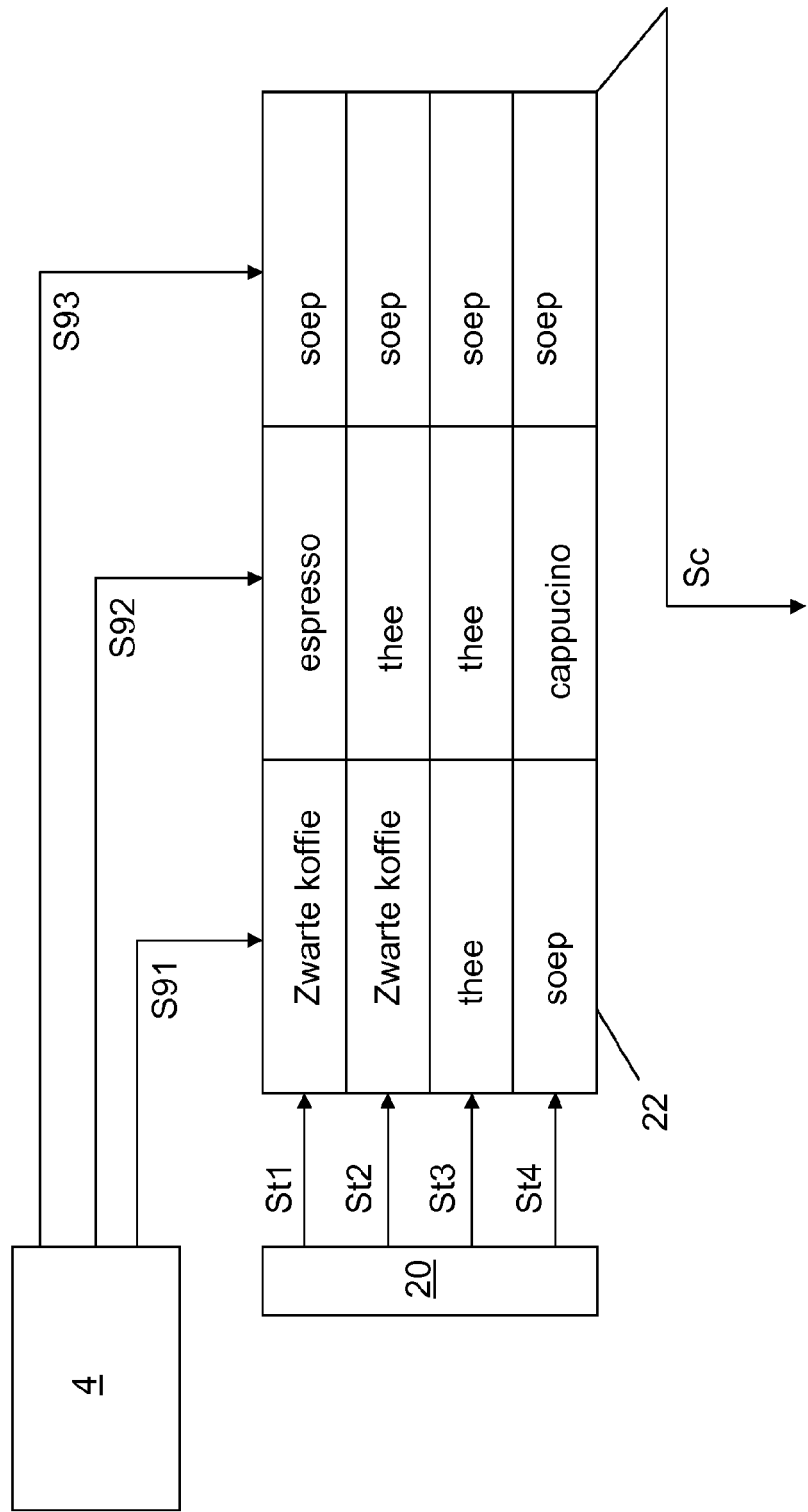
FIG. 12 shows schematically a part of the fourth embodiment.

A possible embodiment is shown schematically in FIG. 12. In the embodiment shown, there are three selection fields 91, 92, 93 for respective users. Designation of the selection fields 91, 92, 93, respectively, results in generation of the signals S91, S92, S93. The clock unit 20 generates signals St1, St2, St3, St4 depending on the time of day. In a first daily period until 10:00, for example, the signal St1 is generated. In a second daily period from 10:00 to 13:00, for example, St2 is generated. In a third daily period from 13:00 to 16:00, for example, St3 is generated, and in a fourth daily period after 16:00, for example, St4 is generated. In a memory 22, a formulation of a beverage to be prepared is thereupon looked up at a location that depends on the generated signal S91, S92, or S93, which is representative of the selection of the selection field 91, 92, or 93 and of the signal generated by the clock unit 20. With the aid of the control signal Sc, which depends on the retrieved formulation, the preparation unit 6 is thereupon controlled.

In the embodiment shown, the person associated with selection field 91 has indicated for the first, second, third and fourth daily periods as preferences for the beverage to be prepared: "black coffee", "black coffee", "tea", "soup". A person associated with the second selection field 92 has specified for the different daily periods in succession the preferences "espresso", "tea", "tea", and "soup". A person associated with the third selection field 92 has indicated he or she wishes to drink exclusively soup, regardless of the time of day.

It is not requisite for the daily periods to be fixed nor do they have to be the same for every user.

Figure 13:
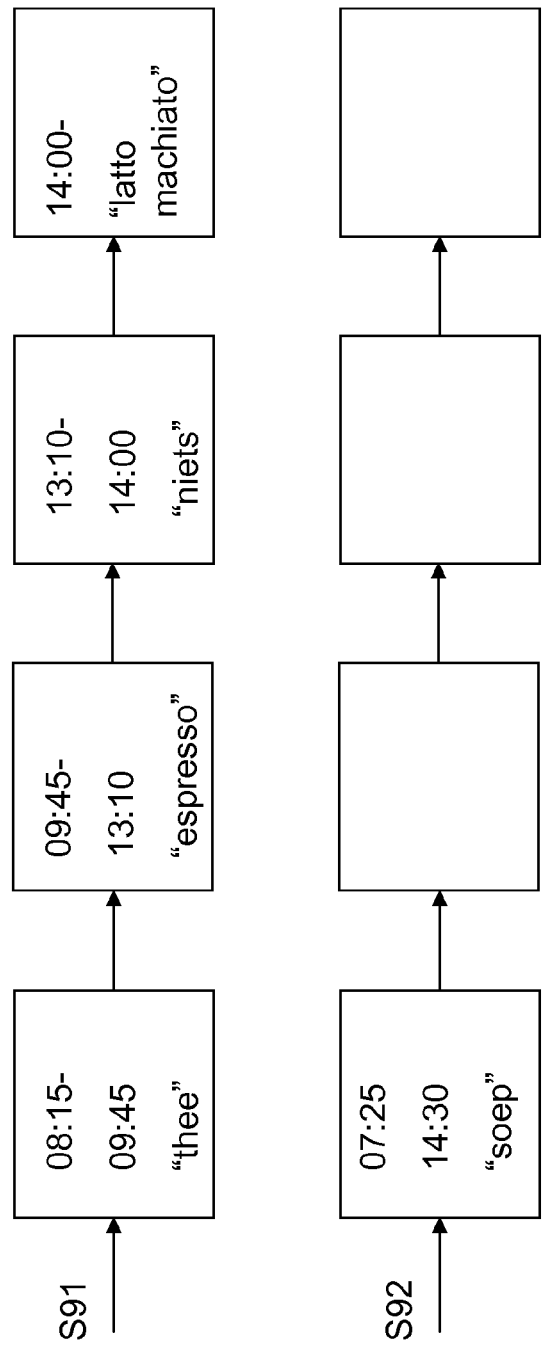
FIG. 13 shows schematically a variant of said part.

FIG. 13 shows a variant in which for every user in a linked list, for self-selected time intervals, the desired formulation is indicated. For the user who is associated with selection field 91, it is then indicated, for example, that he or she drinks tea in the daily period from 08:15 to 09:45, drinks espresso in the daily period from 09:45 to 13:10. In this example, this user has further indicated that he or she does not want to drink anything between 13:10 and 14:00 and after 14:00 wants to drink exclusively latte macchiato.

A second user, associated with selection field 92, in turn has a different first time interval, running from 07:25 to 14:30, in which he or she drinks soup.

After a selection field has been designated, the formulation valid for the time of designation is looked up in the associated linked list and with the control signal Sc the preparation unit 6 is controlled to prepare the beverage with that formulation.

For clarity, it has been assumed in this description that every selection field has an own signal line S91, S92, S93 for every user. Naturally, the signaling of the selection field is not limited to this form. Any other form of digital or analog signaling is suitable. Conventionally, for example, use is made of a bus with a plurality of binary signal lines. With this, it can be indicated in binary representation which of the selection fields has been selected.

It may be that in an environment, the number of workers is too large to display the image elements associated with them on the display simultaneously. In that case, there may be provided a group selection field with associated image element per group of workers. After a group selection field has been selected, the selection fields with the associated image elements for that group are then shown, after which selection per worker can take place. In environments with a great many workers it is possible to provide super groups, where every super group has a super group selection field with associated image element, and selection of a super group results in the showing of the group selection fields with the image elements of the groups falling under them. After this, in turn, a group can be selected and then the worker.

Figure 14:
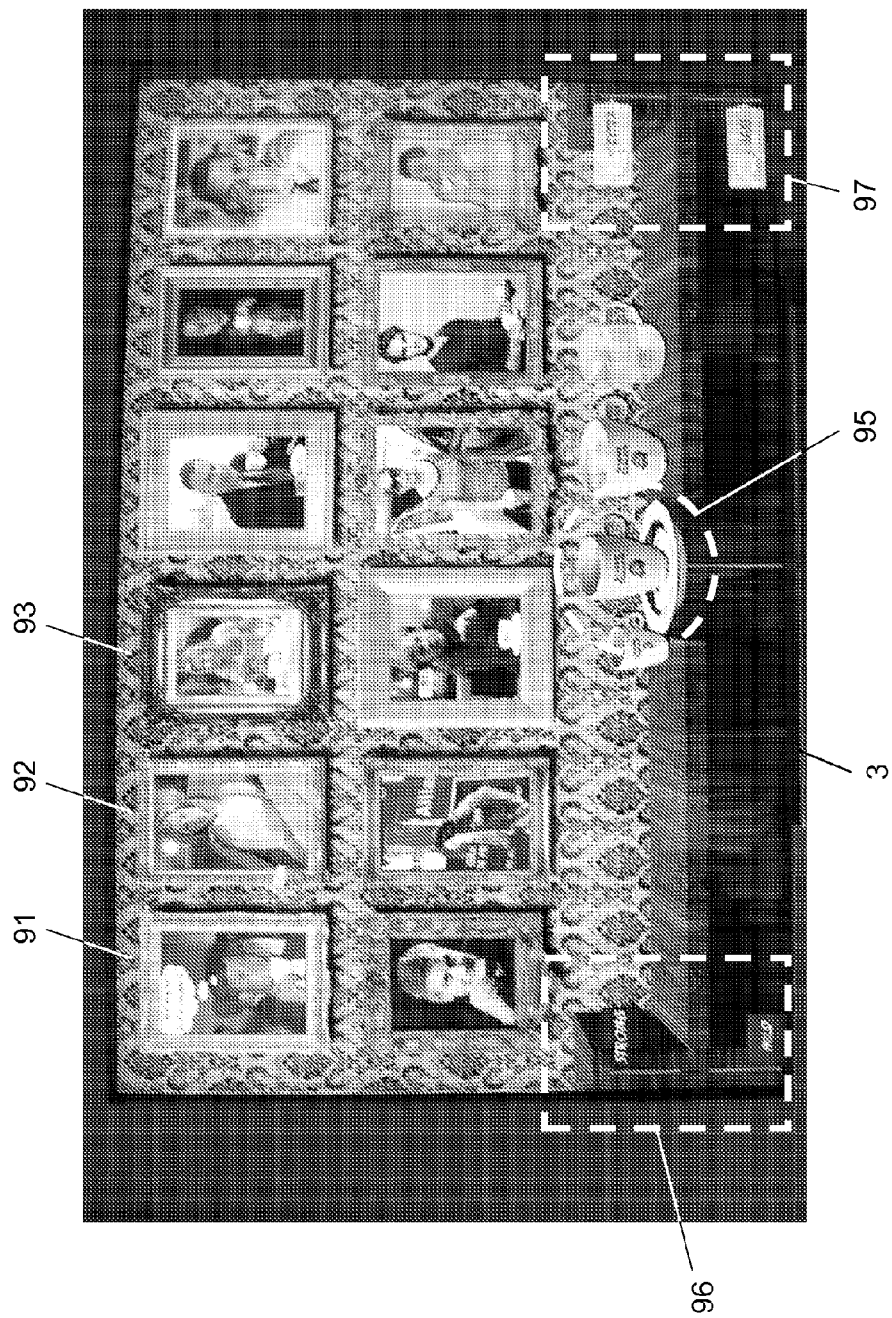
FIG. 14 shows a concrete display at the control unit of the fourth embodiment.

FIG. 14 shows a display of the display panel in a practical embodiment of the control unit. In this display, the display panel shows in respective selection fields 91, 92, 93, . . . twelve portraits of users of the device. After designation of one of the selection fields, the display panel shows symbolically in show field 95 the beverage on record in the memory 22 for that user at that time, after which that beverage is prepared. If desired, a confirmation can be asked by designating a confirmation field. With virtual slide regulators 96, 97, optionally the strength of the beverage and an addition of milk can be set.

The operating unit 5 of the device may be implemented with dedicated hardware or as a general signal processor programmed for that purpose. But also a combination of programmable and dedicated hardware may be used. An at least partly programmable implementation of the operating unit has the advantage that the associated software can easily be replaced, e.g., to improve the interaction with the user. The replacement software may be loaded, for example, via the internet.

Although the present invention has been shown in detail on the basis of examples and described in the drawings and the preceding description, the invention is not limited to these examples. Other variations of the exemplary embodiments disclosed may be understood and used on the basis of the description, the drawings and the claims by the skilled person in carrying out the claimed invention. In the claims, the word "comprising" does not exclude other elements or steps. The indefinite article "a" does not exclude plurality. A single processor or unit can in practice carry out functions of different elements recited in the claims. The mere fact that some features are mentioned in mutually different claims does not exclude the possibility of a favorable combination of those features. Thus, for example, it is conceivable that the different embodiments of the control unit are used in one and the same device, as desired. Reference numerals in the claims are understood not to limit the scope of protection of the claims.

The invention claimed is:

1. A control unit for an automatic device for preparing a beverage for a user, the control unit comprising:
   a display panel and an input which enables the user by designations of image elements shown on the display panel to choose from a plurality of formulations a formulation for the beverage to be prepared;
   a memory having respective sets of storage locations for respective persons, each set of storage locations for a respective person comprising respective storage locations for storing a formulation of a beverage for said respective person for a respective daily period;
   an operating unit for displaying by the display panel a visually observable reaction to designations provided by the user, and for controlling a preparation unit of the automatic device with an operating condition in which the display panel shows a plurality of image elements, which coincide with respective personal selection fields associated with said respective persons, said personal selection fields being identifiable by their respective image element;
   a clock unit for establishing time, and wherein a formulation for a beverage to be prepared is jointly determined by the selection of one of said personal selection fields and a time established by the clock unit, wherein said formulation is the formulation looked up at a storage location in said memory for a daily period as indicated by said established time and selected from the set of storage locations for the person associated with the selected personal selection field.

2. The control unit according to claim 1, wherein the display panel, during operation, shows furthermore a menu for setting a composition of a beverage to be prepared by the device.

3. The control unit according to claim 2, wherein the display panel, during operation, shows furthermore a storage selection field, designation of which results in the storage of the formulation of the beverage composed by the user in a memory.

4. A method for controlling an automatic device for preparing a beverage for a user, the method comprising:
   storing for respective persons respective sets of formulations of a beverage in respective sets of storage locations in a memory, therewith storing in each location of the respective set of storage locations for a person respective formulations of a beverage for said respective persons for a respective daily period;
   enabling the user, by designations of displayed image elements, to choose from a plurality of formulations a formulation for the beverage to be prepared, wherein a visually observable reaction to designations provided by the user is given;

displaying a plurality of personal image elements coinciding with personal selection fields associated with said personal selection fields;

establishing a time with a clock unit, looking up a formulation at a storage location in said memory for a daily period indicated by said established time and selected from the set of storage locations for the person associated with the selected personal selection field, therewith jointly determining a formulation for a beverage to be prepared by a selection of a selection field and an established time.

* * * * *